No. 881,586. PATENTED MAR. 10, 1908.
R. HOWE-GOULD.
FLUID METER.
APPLICATION FILED AUG. 7, 1906.
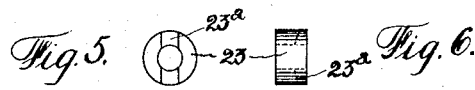
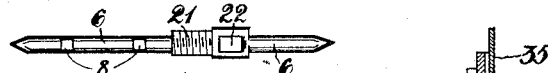
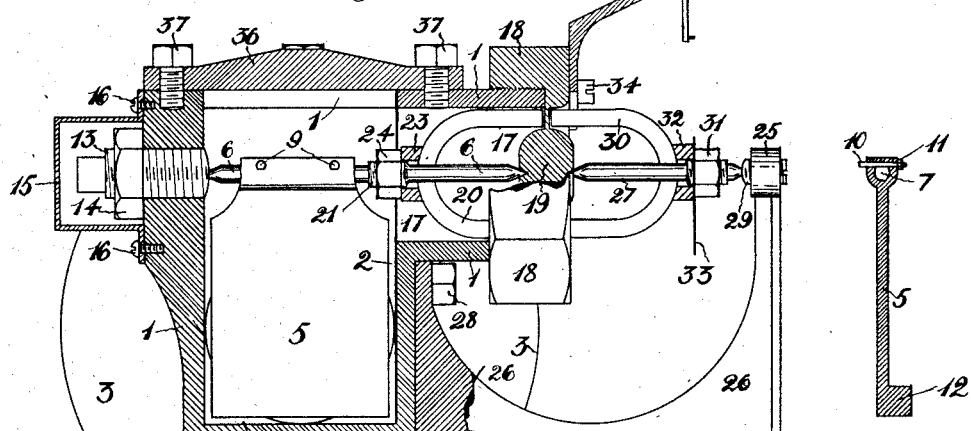
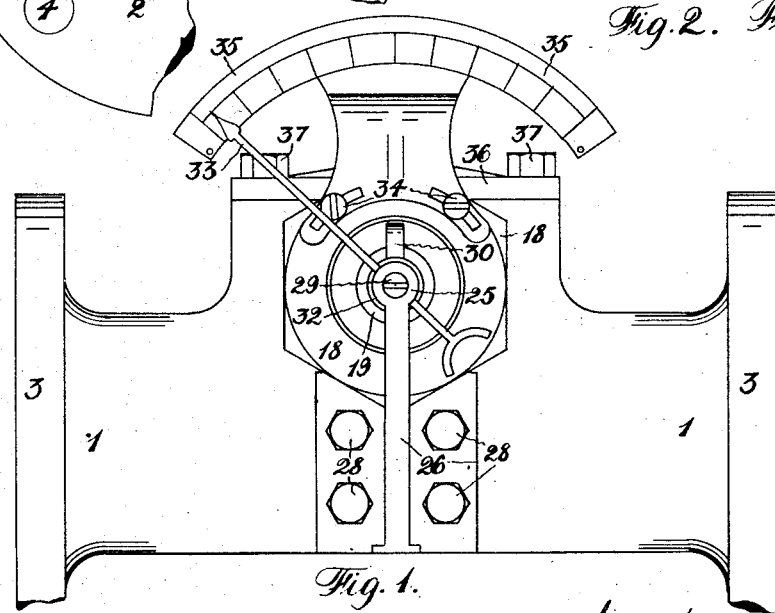

UNITED STATES PATENT OFFICE.

ROBERT HOWE-GOULD, OF SPRINGS, TRANSVAAL.

FLUID-METER.

No. 881,586.

Specification of Letters Patent.

Patented March 10, 1908.

Application filed August 7, 1906. Serial No. 329,550.

*To all whom it may concern:*

Be it known that I, ROBERT HOWE-GOULD, a subject of the King of Great Britain, and resident of Springs, Transvaal, have invented certain new and useful Improvements in Fluid-Meters, of which the following is a specification.

This invention relates to fluid velocity meters or to apparatus intended for measuring the velocity and thereby indicating the volume or quantity of a fluid flowing through a pipe or conduit. This type of meter, as heretofore constructed, has proved unreliable owing to the discrepancy or discrepancies arising through frictional resistance to motion of the parts, especially those parts intermediate of the part directly acted upon by the fluid, and the indicator.

Now the primary object of the present invention is to render such meters more reliable in operation by eliminating as far as possible the discrepancies arising from this cause.

Fluid meters at present in use have necessitated the taking of a reading over a certain time to determine the mean speed of the fluid. A meter constructed in accordance with my invention indicates directly the speed of the fluid.

In the accompanying drawings I illustrate a practical embodiment of the invention.

In the drawings Figure 1 represents the meter in front elevation. Fig. 2 is a transverse part sectional elevation. Fig. 3 is a cross section of the vane showing the means of securing it to its spindle. Fig. 4 is a view of the vane spindle, detached, and Figs. 5 and 6 are front and side elevations respectively of the washer for securing the magnet on the vane spindle.

The meter is shown consisting of a casing 1 providing through it in cross section a rectangular conduit or passage 2 for the fluid. The casing, as shown more particularly in Fig. 1, is constructed at the ends with flanges 3 in which are provided bolt holes 4 for interposing the casing in a line of pipes.

In the conduit or passage 2 is arranged the vane or wing 5 which is so disposed therein that its plane is at right angles or approximately at right angles to the conduit or passage 2 or direction of flow of the fluid through the casing. The vane 5 is hung or freely suspended inside the casing 1 by means of a spindle 6. The top of the vane 5 (see Fig. 3) is constructed with a horizontal hole 7 through which extends a portion of the spindle 6. The spindle (see Fig. 4) is formed with two flats 8, and through coincident holes 9 formed in the top of the vane 5 are passed cotter pins 10, on the screwed smaller extremities of which are placed nuts 11 for tightening and securing the pins 10 to fix the vane 5 to the spindle 6. Any other suitable device or means may be employed for fixing the vane 5 to the spindle 6.

The vane 5 is shown constructed with a projection 12 (see Fig. 3) so as to weight its bottom edge. The ends of the spindle 6 are pointed so as to eliminate frictional resistance to the movement of the spindle in its bearings. One extremity of the spindle 6 runs in a bearing provided in the inner end of an adjusting screw 13 which is screwed through the casing from the exterior. This screw 13 is provided with a lock-nut 14.

15 is a protective cover fixed to the casing by means of screws 16, inclosing the outer end of the screw 13 and nut 14. The casing 1 is shown constructed with a lateral chamber 17 into which projects the other end of the spindle 6. The branch of the casing forming the lateral chamber 17 is formed with an external screw-thread and over it screwed a cover or diaphragm 18 shown fashioned externally into a hexagonal nut. The cover or diaphragm 18 is shown constructed with a boss or enlargement 19 at the center, which strengthens the diaphragm and at the same time affords a bearing for the end of the internal spindle 6. On that end of the spindle 6 which is located in the lateral chamber 17 is fixed a magnet 20. As shown in Fig. 4 the spindle 6 is formed with a threaded portion 21 and with a hole 22. The magnet 20 passes through the hole 22 and is secured therein by means of a washer 23 (see Figs. 5 and 6) which is formed with a curved groove 23ª fitting the curved portion or bend of the magnet 20. 24 is a nut (see Fig. 2) on the threaded portion 21, which is screwed into engagement with the washer 23 thereby securing the magnet 20 in the hole 22 in the spindle 6. By fixing the magnet 20 to the spindle 6 any oscillatory movements of the vane 5 resulting from increase or decrease in the velocity of the fluid flowing through the casing 1 are directly transmitted to said magnet 20 through the spindle 6.

The cover or diaphragm 18, which is made of non-magnetic material, forms a thin drone wall against which the ends of the magnet 20 oscillate on the inside of the lateral chamber 17. The boss or enlarged center portion 19 of the cover or diaphragm 18 provides a bearing on the outside of the chamber 17, which bearing with a further bearing 25 fixed to a frame or bracket 26 carries another spindle 27, which is alined with the internal spindle 6. The bracket 26 is shown secured to the casing 1 by means of the set pins 28; it may, if preferred, be formed integral with the casing. The upper end of the bracket 26 is shown provided with a tapped hole in which is screwed an adjustable screw 29 which forms the bearing for one end of the external spindle 27, the other end of the spindle running in a niche in the boss 19. The external spindle 27, as shown, has fixed to it either another magnet 30 whose poles are oppositely disposed to those of the internal magnet 20, or a piece of soft iron. The external spindle 27 is constructed with a threaded portion and with a hole in which the magnet 30 is secured by means of the nut 31 and washer 32, similar to the internal magnet 20. 33 represents an index finger or pointer which is fixed to the external spindle 27 by clamping it between the nut 31 and washer 32. It is apparent that the soft piece of iron could be fixed to the internal spindle 6 if the magnet be fixed to the external spindle 27.

To the nut or diaphragm 18 is fixed by means of screws 34 a dial 35 suitably graduated to indicate the quantity of fluid passing through the meter in gallons, liters or cubic feet per minute, hour or other predetermined period of time.

The casing 1 is constructed with an opening normally closed by means of a cover 36 held down by means of set pins 37, to provide for ready access to the interior of the casing.

The amplitude of the vane 5 or the extent of its deflection from the vertical, varying with the velocity of the fluid, is transmitted through the magnets 20, 30, to the external spindle 27 and index finger 33 in a manner that will be well understood.

What I claim as my invention and desire to protect by Letters Patent is:—

1. In a fluid-velocity meter, a casing having a passage therethrough and a lateral chamber opening through said passage, a freely movable spindle crosswise of the passage, a part directly acted upon by the fluid and engaging the spindle and a magnet located within the lateral chamber and adjustably connected with said spindle, in combination with indicator means located externally of the casing and comprising a spindle alined with that first mentioned and a piece of magnetic material influenced by the aforesaid magnet and adjustably connected with the second-mentioned spindle, and an indicator dial adjustably connected with said casing and constituting part of the indicator means.

2. In a fluid velocity meter, in combination, a casing forming a conduit for the fluid and constructed to form a lateral chamber, a vane in said casing with its plane at right angles to the direction of flow of the fluid through the conduit, a spindle supporting the vane and fixed thereto the spindle projecting into the lateral chamber, adjustable bearings for said spindle, a magnet fixed to the spindle inside the lateral chamber, a cover for said lateral chamber forming a drone wall, an external spindle, adjustable bearings therefor, an external magnet fixed to said external spindle the poles of the magnets being oppositely disposed, and an index finger or pointer carried by the external spindle to which the movements of the vane are transmitted through the magnets.

3. In a fluid velocity meter, in combination, a casing forming a conduit for the fluid and constructed to form a lateral chamber, a vane in said casing with its plane at right angles to the direction of flow of the fluid through the conduit, a spindle supporting the vane and fixed thereto said spindle projecting into the lateral chamber, adjustable bearings for said spindle, a magnet fixed to the spindle inside the lateral chamber, a cover for said lateral chamber forming a non-magnetic wall, adjustable bearings for said external spindle, an external magnet fixed to said external spindle, the poles of the magnets being oppositely disposed, an index finger or pointer carried by the external spindle to which the movements of the vane are transmitted through the magnets, and a graduated dial for indicating the volume or quantity of fluid flowing through the conduit.

In witness whereof I have hereunto set my hand in the presence of two subscribing witnesses.

ROBERT HOWE-GOULD.

Witnesses:
   CHAS. OVENDALE,
   R. OVENDALE.